United States Patent
Lehman et al.

(10) Patent No.: US 10,829,633 B2
(45) Date of Patent: Nov. 10, 2020

(54) EPOXY RESIN COMPOSITIONS AND FIBER-REINFORCED COMPOSITE MATERIALS PREPARED THEREFROM

(71) Applicant: Toray Industries, Inc., Tokyo (JP)

(72) Inventors: Benjamin Lehman, Tacoma, WA (US); Jonathan Hughes, Tacoma, WA (US); Swezin Than Tun, Tacoma, WA (US); Nobuyuki Arai, Tacoma, WA (US)

(73) Assignee: Toray Industries, Inc., Tokyo (JP)

(*) Notice: Subject to any disclaimer, the term of this patent is extended or adjusted under 35 U.S.C. 154(b) by 85 days.

(21) Appl. No.: 16/340,530

(22) PCT Filed: Oct. 19, 2017

(86) PCT No.: PCT/IB2017/001484
§ 371 (c)(1),
(2) Date: Apr. 9, 2019

(87) PCT Pub. No.: WO2018/073652
PCT Pub. Date: Apr. 26, 2018

(65) Prior Publication Data
US 2020/0048453 A1    Feb. 13, 2020

Related U.S. Application Data

(60) Provisional application No. 62/411,278, filed on Oct. 21, 2016, provisional application No. 62/567,990, filed on Oct. 4, 2017.

(51) Int. Cl.
*C08L 63/00* (2006.01)
*C08G 59/38* (2006.01)
(Continued)

(52) U.S. Cl.
CPC .............. *C08L 63/00* (2013.01); *C08G 59/38* (2013.01); *C08G 59/5033* (2013.01);
(Continued)

(58) Field of Classification Search
CPC .......... C08G 59/38; C08G 59/50–5093; C08G 59/687; C08J 5/24; C08J 2363/00–10;
(Continued)

(56) References Cited

U.S. PATENT DOCUMENTS 7,732,627 B2    6/2010    Takai et al.
2003/0064228 A1    4/2003    Oosedo et al.
(Continued)

FOREIGN PATENT DOCUMENTS

JP    2004307766 A    11/2004
JP    2016132752 A    7/2016
(Continued)

OTHER PUBLICATIONS

International search Report and Written Opinion for International Application No. PCT/IB2017/001484, dated Apr. 17, 2018, 5 pages.
(Continued)

*Primary Examiner* — Kregg T Brooks
(74) *Attorney, Agent, or Firm* — RatnerPrestia

(57) ABSTRACT

An epoxy resin composition for a fiber-reinforced composite material, containing at least components [A], [B], [C], [D], and [E], wherein the epoxy resin composition when cured has a glass transition temperature greater than 220° C. and a storage modulus, as defined by a specific method, less than 35 MPa, as determined from an elastic shear modulus measured at a temperature of at least 35° C. higher than the glass transition temperature, wherein the components [A], [B], [C], [D], and [E] are:
[A] at least one naphthalene-based epoxy resin having an EEW between 190 and 260 g/mol;
[B] at least one epoxy resin having a functionality of three or more;
[C] at least one amine curing agent;
(Continued)

Storage modulus of cured epoxy resin as a function of temperature

[D] at least one latent acid catalyst; and
[E] at least one cycloaliphatic epoxy resin.

This epoxy resin composition is useful in the molding of fiber-reinforced composite materials. More particularly, it is possible to offer an epoxy resin composition for a fiber-reinforced composite material where the cured material obtained by heating has high levels of heat resistance and microcrack resistance.

17 Claims, 1 Drawing Sheet

(51) Int. Cl.
  *C08G 59/50* (2006.01)
  *C08G 59/68* (2006.01)
  *C08J 5/24* (2006.01)
  *C08K 5/00* (2006.01)
  *C08K 5/17* (2006.01)

(52) U.S. Cl.
  CPC .............. *C08G 59/687* (2013.01); *C08J 5/24* (2013.01); *C08J 2363/00* (2013.01); *C08K 5/0025* (2013.01); *C08K 5/17* (2013.01)

(58) Field of Classification Search
  CPC ........ C08L 63/00–10; C09D 163/00–10; C09J 163/00–10
  See application file for complete search history.

(56) References Cited

U.S. PATENT DOCUMENTS

| | | |
|---|---|---|
| 2004/0044141 A1 | 3/2004 | McGrail et al. |
| 2004/0242839 A1 | 12/2004 | Takai |
| 2011/0049426 A1 | 3/2011 | Patel et al. |
| 2014/0100320 A1 | 4/2014 | Nagano et al. |
| 2014/0357836 A1 | 12/2014 | Kitao et al. |

FOREIGN PATENT DOCUMENTS

| | | |
|---|---|---|
| JP | 2016160352 A | 9/2016 |
| WO | 0192368 A | 12/2001 |
| WO | 2017033056 A1 | 3/2017 |

OTHER PUBLICATIONS

International Preliminary Report on Patentability and Written Opinion for International Application No. PCT/IB2017/001484, dated Apr. 23, 2019, 5 pages.

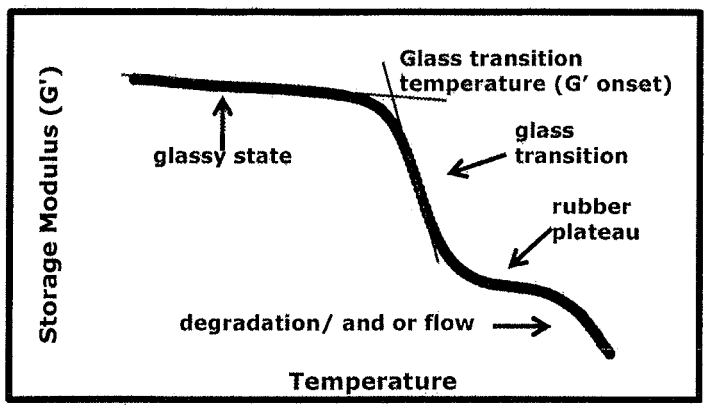
Figure 1. Storage modulus of cured epoxy resin as a function of temperature
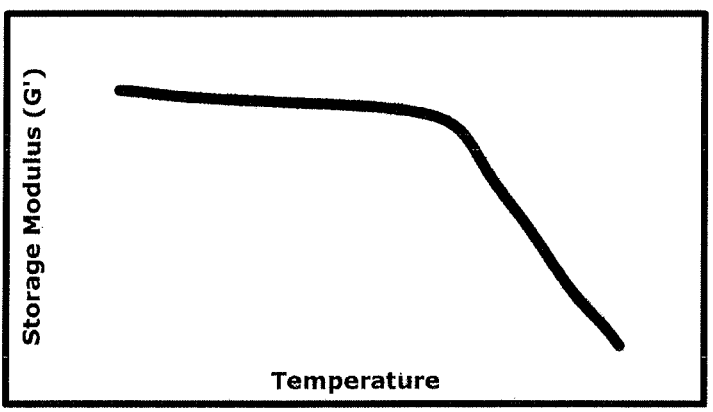
Figure 2. Storage modulus of cured epoxy resin that does not display a rubber plateau as a function of temperature.

EPOXY RESIN COMPOSITIONS AND FIBER-REINFORCED COMPOSITE MATERIALS PREPARED THEREFROM

CROSS-REFERENCE TO RELATED APPLICATIONS

This is the U.S. National Phase application of PCT/IB2017/001484, filed Oct. 19, 2017, which is related to, and claims the benefit of priority of, U.S. Provisional Application No. 62/411,278, filed on 21 Oct. 2016, and U.S. Provisional Application No. 62/567,990, filed on 4 Oct. 2017, the contents of each of these applications being incorporated herein by reference in their entirety for all purposes.

FIELD OF THE INVENTION

The invention relates to high glass transition temperature epoxy resin compositions useful for producing fiber-reinforced composite materials.

BACKGROUND OF THE INVENTION

In recent years, fiber-reinforced composite materials using reinforcing fibers such as carbon fibers and aramid fibers have been used as structural materials in aircraft and motor vehicles, for sports applications such as tennis rackets, golf shafts and fishing rods, and general industrial applications and the like owing to the high specific strength and specific elastic modulus thereof. Methods for producing fiber-reinforced composite materials include a method of using a prepreg as an intermediate sheet-like material involving impregnating reinforcing fibers with an uncured matrix resin to form a prepreg, laminating multiple plies of the prepreg and subsequently heating to cure the matrix resin, and a resin transfer molding method of pouring a liquid resin into reinforcing fibers, disposed in a mold and subsequently heating the resin for curing.

Among these production methods, the method of using a prepreg has an advantage that a fiber-reinforced composite material with high performance can be easily obtained because the orientation of reinforcing fibers can be strictly controlled and because the degree of freedom in designing a laminate configuration is high. Thermosetting resins are mainly used as the matrix resins in the prepregs in view of heat resistance and productivity; among the thermosetting resins, epoxy resins are suitably used in view of the adhesiveness between the resin and the reinforcing fibers, dimensional stability, and mechanical properties such as strength and stiffness of the composite material obtained.

Hitherto as methods for enhancing the toughness of an epoxy resin are, for example, methods of mixing a rubber ingredient, thermoplastic resin or block copolymer excellent in toughness for forming a phase-separated structure together with an epoxy resin have been tried in U.S. Pat. Pub. Nos. 20110049426 and 20140100320. However, in the case where an epoxy resin composition is employed in fiber-reinforced composite material applications, there will inevitably be included a stage in which reinforcing fiber is impregnated with the epoxy resin composition, so rheological control techniques for achieving a low resin viscosity at a stable temperature are extremely important.

The glycidyl epoxies used in the resin compositions such as those disclosed in U.S. Pat. Pub. Nos. 20110049426 and 20140100320 can achieve a low resin viscosity at stable temperatures for impregnating reinforcing fibers. However, the copolymers added to these epoxy resin compositions increase the viscosity at room temperature, making prepregs obtained from impregnating these compositions into reinforcing fibers difficult to handle at ambient temperatures.

Including a cycloaliphatic epoxy resin in a resin composition can reduce the viscosity relative to an epoxy resin composition containing only glycidyl type epoxy resins, as disclosed in U.S. Pat. Pub. No. 20030064228. However, in the case of U.S. Pat. Pub. No. 20030064228, the cycloaliphatic epoxies used to reduce the viscosity also reduce the glass transition temperature of the cured matrix because of their large aliphatic backbone. To solve this problem, the present invention involves incorporating a cycloaliphatic epoxy wherein the cycloaliphatic epoxy moieties are connected by a linkage group having a molecular weight less than 45 g/mol to achieve both a high level of heat resistance in the cured matrix and low resin viscosity at room temperature.

The present invention therefore seeks to provide an epoxy resin composition that can be cured to form a cured product excellent in heat resistance and toughness by overcoming the disadvantages of the prior arts as described above. Another objective is to provide a fiber-reinforced composite material excellent in heat resistance and resistance to microcracking after thermal cycling.

SUMMARY OF THE INVENTION

This invention relates to an epoxy resin composition for a fiber-reinforced composite material, comprising, consisting essentially of or consisting of components [A], [B], [C], [D], and [E], wherein the epoxy resin composition when cured has a glass transition temperature greater than 220° C. and a storage modulus, as defined by a specific method, less than 35 MPa, as determined from an elastic shear modulus measured at a temperature of at least 35° C. higher (in one embodiment, at a temperature 35° C. higher) than the glass transition temperature of the epoxy resin composition when cured, wherein the components [A], [B], [C], [D], and [E] comprise, consist essentially of or consist of:
   [A] at least one naphthalene-based epoxy resin having an EEW (Epoxide Equivalent Weight) between 190 and 260 g/mol;
   [B] at least one epoxy resin having a functionality of three or more;
   [C] at least one amine curing agent;
   [D] at least one latent acid catalyst; and
   [E] at least one cycloaliphatic epoxy resin.

Thus, component [A] may comprise, consist essentially of or consist of one or more naphthalene-based epoxy resins having an EEW (Epoxide Equivalent Weight) between 190 and 260 g/mol, component [B] may comprise, consist essentially of or consist of one or more epoxy resins having a functionality of three or more, component [C] may comprise, consist essentially of or consist of one or more amine curing agents, component [D] may comprise, consist essentially of or consist of one or more latent acid catalysts, and component [E] may comprise, consist essentially of or consist of one or more cycloaliphatic epoxy resins. The epoxy resin composition may, or may not, additionally contain one or more components other than components [A], [B], [C], [D], and [E].

This epoxy resin composition is useful in the molding of fiber-reinforced composite materials. More particularly, the present invention makes it possible to provide an epoxy resin composition for a fiber-reinforced composite material where the cured material obtained by heating has a high level of heat resistance, high strength properties and is resistant to microcracking. In the field of this invention, a material having a high level of heat resistance is defined as a material having a high glass transition temperature and high mechanical properties at or close to that temperature In one embodiment, component [A] may include at least one epoxy resin represented by formula I:

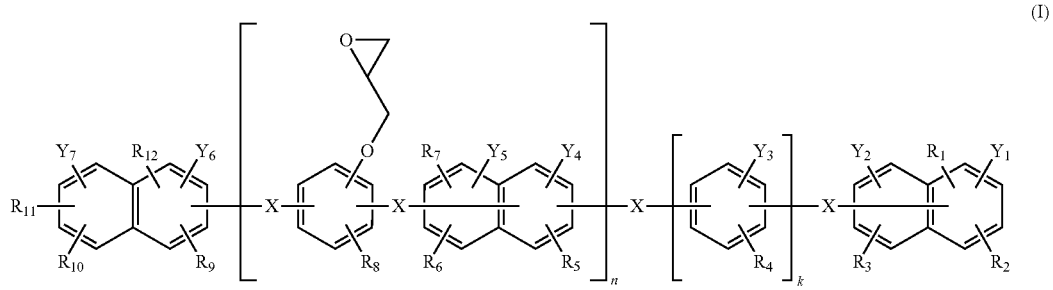

wherein $R_1$ to $R_{12}$ are each independently selected from the group consisting of hydrogen atoms, halogen atoms, C1 to C10 alkyl groups, C1 to C10 alkoxyl groups, C1 to C10 fluoroalkyl groups, cycloalkyl groups, aryl groups, aryloxyl groups, and glycidoxy groups, $Y_1$ to $Y_7$ are each independently selected from the group consisting of hydrogen atoms, halogen atoms, C1 to C10 alkyl groups, C1 to C10 alkoxyl groups, C1 to C10 fluoroalkyl groups, cycloalkyl groups, aryl groups, aryloxyl groups, and glycidoxy groups, wherein each benzene nucleus may be substituted with one or more Y groups, n is 0 or an integer of 1 to 5, k is 0 or an integer of 1 to 3, wherein the Y groups may be attached to either or both rings of each naphthalene nucleus; and each X is independently selected from the group consisting of a direct bond, —$CH_2$—, —$C(CH_3)_2$—, —S—, —$SO_2$—, —O—, —C(=O)O—, —C(=O)NH—, C1 to C6 alkylene groups, C1 to C6 alkoxylene groups, cycloalkylene groups, arylene groups and aryloxylene groups, wherein these groups are optionally employed individually or different groups are optionally employed in combination as X.

In another embodiment, component [A] may include at least one epoxy resin represented by formula II:

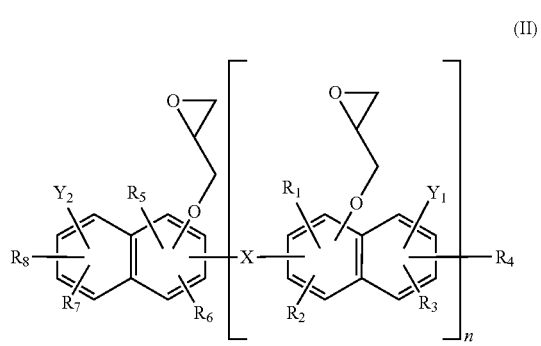

wherein n represents the number of repeating units and is an integer of 1 or more (e.g., 1-10); $R_1$ to $R_8$ are each independently selected from the group consisting of a hydrogen atom, halogen atoms, C1 to C6 alkyl groups, C1 to C6 alkoxyl groups, C1 to C6 fluoroalkyl groups, cycloalkyl groups, aryl groups, and aryloxyl groups wherein these groups are optionally employed individually or different groups are optionally employed in combination as each of $R_1$ to $R_8$; $Y_1$ and $Y_2$ are each independently selected from the group consisting of a hydrogen atom or glycidyl ether (glycidoxy) groups; and each X is independently selected from the group consisting of a direct bond, —$CH_2$—, —$C(CH_3)_2$—, —S—, —$SO_2$—, —O—, —C(=O)O—, —C(=O)NH—, C1 to C6 alkylene groups, C1 to C6 alkoxylene groups, cycloalkylene groups, arylene groups and aryloxylene groups, wherein these groups are optionally employed individually or different groups are optionally employed in combination as X.

The glycidyl ether (glycidoxy) groups on the naphthalene moieties may be bonded to any of the carbon atoms of each naphthalene ring in any combination. The glycidyl ether groups may therefore be present at the 2, 3, 4, 5, 6, and/or 7 positions of any of the naphthalene rings present, and where there is more than one glycidyl ether group these may be present in any suitable combination on any of the naphthalene rings of the epoxy resin.

In another embodiment, component [B] may include at least one epoxy resin having a functionality of three or more (i.e., an epoxy resin containing three or more epoxy groups, such as glycidoxy groups, per molecule). In another embodiment of the invention, the ratio of component [A] to component [B] is from 1:5 to 2:1.

In another embodiment of the invention, component [C] of the epoxy resin composition may include at least one aromatic polyamine, such as a diaminodiphenylsulfone, wherein the amount of component [C] added is calculated using the AEW (Amine Equivalent Weight, sometimes also referred to as AHEW or Amine Hydrogen Equivalent Weight) of component [C] and the EEW (Epoxide Equivalent Weight) of components [A] and [B] so that the molar AEW/EEW ratio is 0.7 to 1.3.

In another embodiment of the invention, component [D] may include at least one onium salt catalyst represented by formula (III):

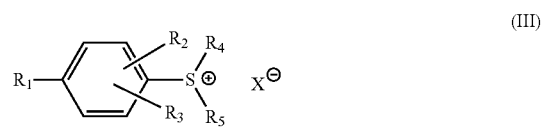

wherein $R_1$ represents a hydrogen atom, a hydroxyl group, an alkoxyl group, or a group represented by formula (IV):

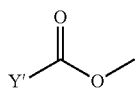

(IV)

wherein Y' represents an alkyl group, an alkoxyl group, a phenyl group or a phenoxy group, all of which may have one or more substituents, each of $R_2$ and $R_3$ independently represents a hydrogen atom, a halogen atom, or an alkyl group, each of $R_4$ and $R_5$ independently represents an alkyl group, an aralkyl group or an aryl group, each of which may have one or more substituents, and $X^-$ represents $SbF_6^-$, $PF_6^-$, $AsF_6^-$, or $BF_4^-$.

In another embodiment of the invention, component [E] includes at least one cycloaliphatic epoxy resin represented by formula (V), wherein Y is a single bond or represents a divalent moiety having a molecular weight less than 45 g/mol.

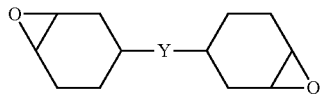

(V)

In another embodiment of the invention, the epoxy resin composition may additionally be comprised of constituent component [F], wherein the component [F] comprises at least one thermoplastic resin, such as a polyethersulfone.

In another embodiment of the invention, the epoxy resin composition may additionally be comprised of constituent component [G], wherein the component [G] comprises thermoplastic resin particles with an average particle diameter of 5 to 50 μm or 5 to 30 μm.

Also provided by the present invention are prepregs comprising carbon fibers impregnated with an epoxy resin composition in accordance with any of the above-mentioned embodiments as well as a carbon fiber-reinforced composite material obtained by curing such a prepreg. Further embodiments of the invention provide a carbon fiber-reinforced composite material comprising a cured resin product obtained by curing a mixture comprised of an epoxy resin composition in accordance with any of the above-mentioned embodiments and carbon fibers.

BRIEF DESCRIPTION OF THE DRAWINGS

FIG. 1 shows the storage modulus of a cured epoxy resin as a function of temperature.

FIG. 2 shows the storage modulus of a cured epoxy resin that does not display a rubber plateau as a function of temperature.

DETAILED DESCRIPTION OF CERTAIN EMBODIMENTS OF THE INVENTION

As a result of extensive research in view of the difficulties described above, the inventors have discovered that the aforementioned problems are resolved by employing, in fiber-reinforced composite material applications, an epoxy resin composition formed by mixing at least two epoxy resins, at least one amine curing agent, at least one latent acid catalyst, and at least one cycloaliphatic epoxy resin having certain structural features, wherein at least two epoxy resins are epoxy resins other than a cycloaliphatic epoxy resin having such structural features.

In the present invention, an epoxy resin means an epoxy compound having at least two 1,2-epoxy groups within the molecule, that is to say one which is at least difunctional.

In certain embodiments of the present invention, constituent component [A] preferably comprises (or consists essentially of or consists of) at least one aromatic glycidyl ether type epoxy resin having at least one naphthalene structural moiety and an epoxy equivalent weight (EEW) between 190 and 260 g/mol and/or at least one aromatic glycidyl amine type epoxy resin having at least one naphthalene structural moiety and an epoxy equivalent weight (EEW) between 190 and 260 g/mol. A "glycidyl ether type epoxy resin" means an epoxy resin containing one or more glycidyl ether (glycidoxy) groups, as is formed by reacting epichlorohydrin with an alcohol (e.g., a hydroxyl-substituted naphthalene). A "glycidyl amine type epoxy resin" means an epoxy resin containing one or more glycidyl amine groups, as is formed by reacting epichlorohydrin with an amino-substituted naphthalene. Including these types of epoxies in the resin composition improves both the elastic modulus and the heat resistance of the cured material without the negative effects of over-embrittlement. As used herein, the term "naphthalene-based epoxy resin" means an epoxy resin which contains at least one naphthalene structural moiety to which one or more epoxy group-containing substituents (such as glycidyl ether and/or glycidyl amine groups) are attached directly to the naphthalene structure or adjacent moieties in the epoxy resin (such as benzene moieties).

Without wishing to be bound by theory, it is believed that the naphthalene-based epoxy resins, which constitute part of an epoxy resin composition as described herein, provide a high glass transition temperature and low storage modulus at a temperature of at least 35° C. higher (in one embodiment, at a temperature 35° C. higher) than the glass transition temperature of the epoxy resin composition once the epoxy resin composition has been cured. This is remarkable, as typically high crosslink density is required to achieve a high glass transition temperature. Unfortunately, high crosslink density also leads to brittle materials having high storage moduli which are predisposed to microcracking when exposed to thermal cycling. As shown in FIG. 1, the storage modulus of cured epoxy resin compositions may display several transitions and/or plateaus when it is measured as a function of temperature. Certain cured epoxy resin compositions, including certain embodiments of the present invention, may display none or all of the following transitions and plateaus: glassy state, glass transition, rubber plateau, degradation, flow. In the case of cured epoxy resins exhibiting multiple transitions and plateaus, the rubber plateau is defined as the plateau occurring after the glass transition with the largest change in storage modulus. For cured epoxy resin compositions that do not display a defined rubber plateau on the storage modulus as a function of temperature graph, as shown in FIG. 2, the theoretical rubber plateau can be interpreted as the elastic shear modulus measured at a temperature of at least 35° C. higher than the glass transition temperature.

It is believed that microcracking occurs in fiber reinforced plastic materials due to the difference in the coefficient of thermal expansion of the fibers and the resin. The above-mentioned component [A] is an essential component for an epoxy resin composition to successfully provide excellent performance in a composite structure containing the epoxy resin component in cured form, particularly at high temperatures, wherein the composite structure is exposed to both hot and cold temperatures.

If the amount of naphthalene-based epoxy resin is too small, the crosslinking density becomes too high and the material is more susceptible to microcracking. If the amount is too large, the crosslinking density becomes low and the material may lack rigidity. Hence, the rigidity of the carbon fiber-reinforced composite material may be impaired. In some embodiments the amount of naphthalene-based epoxy resin is 5 to 45 parts by weight of the total amount of epoxy resins. Other embodiments use 15 to 35 parts by weight naphthalene-based epoxy resin by weight of the total amount of epoxy resins.

Examples of suitable naphthalene-based glycidyl ether epoxy resins are shown below as formulas VI, VII, and VIII:

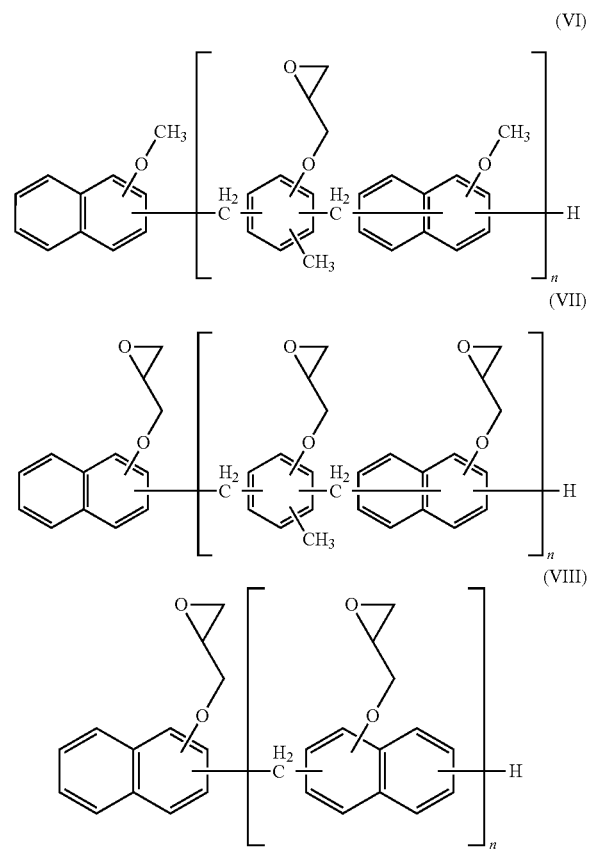

Naphthalene-based glycidyl ether epoxy resins corresponding to formula VI are described, for example, in U.S. Pat. No. 8,420,749. In formulae VI, VII and VIII, n may be an integer of 1 or more, e.g., 1-5 or 1-10.

The epoxy resin compositions of the present invention include as component [B] at least one epoxy resin having a functionality of three or more, that is, epoxy resins containing at least three epoxy functional groups per molecule (e.g., three, four, five, six or more epoxy functional groups per molecule). Such epoxy resins are different from the naphthalene-based epoxy resins having an EEW between 190 and 260 g/mol employed in component [A] and the cycloaliphatic epoxy resins employed in component [E].

In some embodiments of the present invention, constituent component [B] preferably comprises (or consists essentially of or consists of) at least one aromatic glycidyl ether type epoxy resin and/or at least one aromatic glycidyl amine type epoxy resin containing three or more epoxy functional groups per molecule.

Examples of tri- or higher-functional glycidyl ether type epoxy resins include phenol novolac type epoxy resins (i.e., epoxy resins which can be made by reacting a phenol novolac with epichlorohydrin), ortho-cresol novolac type epoxy resins (i.e., epoxy resins which can be made by reacting an ortho-cresol novolac with epichlorohydrin), tris-hydroxyphenyl methane type epoxy resins (i.e., epoxy resins which can be made by reacting a tris-hydroxyphenyl methane with epichlorohydrin), tetraphenylolethane type epoxy resins (i.e., epoxy resins which can be made by reacting a tetraphenylolethane with epichlorohydrin), and combinations thereof.

Among the epoxy resins usable as constituent component [B], tri- or higher-functional glycidyl amine type epoxy resins including diaminodiphenyl methane or diaminodiphenyl ether type epoxy resins (i.e., epoxy resins which can be made by reacting a diaminodiphenyl methane with epichlorohydrin), diaminodiphenylsulfone type epoxy resins (i.e., epoxy resins which can be made by reacting a diaminodiphenylsulfone with epichlorohydrin), aminophenol type epoxy resins (i.e., epoxy resins which can be made by reacting an aminophenol with epichlorohydrin), meta-xylenediamine (MXDA) type epoxy resins (i.e., epoxy resins which can be made by reacting a meta-xylene diamine with epichlorohydrin), 1,3-bisaminomethylcyclohexane type epoxy resins (i.e., epoxy resins which can be made by reacting a 1,3-bisaminomethylcyclohexane with epichlorohydrin), isocyanurate type epoxy resins (i.e., epoxy resins which can be made by reacting an isocyanurate with epichlorohydrin, e.g., tris(2,3-epoxypropyl)isocyanurate), and the like and combinations thereof may be used. Among them, in view of a good balance of physical properties, diaminodiphenylmethane type epoxy resins and aminophenol type epoxy resins in particular can be used.

If the amount of tri- or higher-functional epoxy resins [B] is too small, heat resistance is impaired. If the amount is too large, the crosslinking density becomes high and the material may be brittle. Hence, the impact resistance and strength of the fiber-reinforced composite material may be impaired.

Specific examples of suitable aromatic glycidyl amine type epoxy resins useful as component [B] include N,N,N',N'-tetraglycidyl-4,4'-diaminodiphenylmethane, N,N,N',N'-tetraglycidyl-4,4'-methylenebis(2-ethylbenzenamine), tri-glycidyl-m-aminophenol and the like. In the present invention, epoxy resins which combine both aromatic glycidyl ether type epoxy resin and aromatic glycidyl amine type epoxy resin structures are included amongst the aromatic glycidyl amine type resins.

It is also possible for the epoxy resin compositions of the present invention to contain one or more epoxy resins other than those categorizable as components [A], [B] and [E]. However, in various embodiments of the invention, the epoxy resin composition contains no epoxy resin other than the epoxy resins of components [A], [B] and [E] or less than 10 or less than 5 parts by weight of epoxy resin other than the epoxy resins of components [A], [B] and [E] per 100 parts by weight of total epoxy resin.

In this invention, a thermosetting resin which is not an epoxy resin can also be present in the epoxy resin composition in addition to the epoxy resin(s). Examples of such thermosetting resins which may be used together with epoxy resin(s) in the epoxy resin composition of certain embodiments of the present invention include unsaturated polyester resins, vinyl ester resins, benzoxazine resins, phenol resins, urea resins, melamine resins, polyimide resins, and the like. Any one of these thermosetting resins can be used alone, or two or more of them can also be used in combination as appropriate.

In certain embodiments of the present invention, constituent component [C] comprises an amine curing agent or combination of amine curing agents. The curing agent referred to herein is a compound having at least one active amine group (e.g., a primary and/or secondary amino functionality) capable of reacting with an epoxy group and/or accelerating the self-polymerization of epoxy groups. Examples of suitable curing agents include, but are not limited to, dicyandiamide, aromatic amines, aromatic polyamines, aminobenzoic acid esters, imidazole derivatives, aliphatic amines, tetramethylguanidine, thiourea-added amines, and carboxylic acid amides. Combinations and mixtures of different amine curing agents may be utilized.

If an aromatic polyamine is used as the curing agent, a cured epoxy resin product with good heat resistance can be obtained. In certain embodiments diaminodiphenylsulfone curing agents are employed, because curing epoxies with this type of amine curing agent results in cured products having high heat resistance. These curing agents may be supplied as a powder and are employed in the form of a mixture with a liquid epoxy resin composition.

Non-limiting examples of constituent component [C] are m- or p-phenylenediamine, 2,4- or 2,6-diaminotoluene, 2,4- or 2,6-diamino-1-methyl-3,5-diethylbenzene, 3-isopropyl-2,6-diaminotoluene, 5-isopropyl-2,4-diaminotoluene, 5-t-butyl-2,4-diaminotoluene, 3-t-butyl-2,6-diaminotoluene, 3,5-diethylthio-2,4-diaminotoluene, 1,3,5-triethyl-2,6-diaminobenzene, 4,4'-diaminodiphenylmethane, 3,3',5,5'-tetraethyl-4,4'-diaminodiphenylmethane, 3,3',5,5'-tetra-propyl-4,4'-diaminodiphenylmethane, 3,3'-diethyl-4,4'-diaminodiphenylether, 3,4'-diaminodiphenylether, 5,7-diamino-1,1-dimethylindane, 4,6-diamino-1,1-dimethylindane, 4,7-diamino-1,1-dimethylindane, 5,7-diamino-1,1,4,6-tetra-methylindane, 4,4'-diaminodiphenylsulfone, 3,3'-diaminodiphenylsulfone, and combinations thereof.

The amount of amine curing agent [C] present in the epoxy resin compositions of the present invention may be varied and selected as may be desired or needed in order to obtain the desired curing characteristics and final cured properties and will depend upon, for example, the type of amine curing agent(s) used, the types of epoxy resin(s) used, curing conditions and so forth. In certain embodiments component [C] represents from about 5 parts by weight to about 60 parts by weight (or from about 20 parts by weight to about 35 parts by weight) per 100 parts by weight of epoxy resin ([A]+[B]+[E]) in the epoxy resin composition.

In the present invention, constituent component [D] comprises of at least one latent acid catalyst. This latent acid catalyst is a compound which essentially does not function as a catalyst at temperatures in the vicinity of room temperature, but in the high temperature region in which the curing of the epoxy resin is carried out, normally 70-200° C., it either itself functions as an acid catalyst or produces chemical species which serve as an acid catalyst. In the case of the production of chemical species which serve as an acid catalyst, this may be brought about, for example, due to thermal reaction alone or by reaction with epoxy resin or polyamine present in the system.

Examples of constituent component [D] are onium salts of strong acids, such as quaternary ammonium salts, quaternary phosphonium salts, quaternary arsonium salts, tertiary sulphonium salts, tertiary selenonium salts, secondary iodonium salts, and diazonium salts of strong acids and the like. Strong acids may be generated either by the heating of these on their own or, for example, as disclosed in JP-A-54-50596, by the reaction of a diaryliodonium salt or triarylsulfonium salt and a reducing agent such as thiophenol, ascorbic acid or ferrocene, or alternatively, as disclosed in U.S. Pat. No. 4,238,587, by the reaction of a diaryliodonium salt or triarylsulfonium salt and a copper chelate. The species of strong acid generated will be determined by the onium salt counter ion. As the counter ion, there is preferably employed one which is substantially not nucleophilic and where its conjugate acid is a strong acid. Examples of the preferred counter ion here are perchlorate ion, tetrafluoroborate ion, sulfonate ion (p-toluenesulfonate ion, methanesulfonate ion, trifluoromethanesulfonate ion and the like), hexafluorophosphate ion, hexafluoroantimonate ion, tetrakis(pentafluorophenyl)borate ion and the like. Onium salts having these counter ions, while being ionic salts, are outstanding in their solubility in organic compounds and are suitable for use in the present invention.

When combined with cycloaliphatic epoxy resins, sulfonium salt complexes with hexafluoroantimonate and hexafluorophosphate counter ions have superior latency to strong Lewis acids including $BF_3$/piperidine complexes, as disclosed in U.S. Pat. Pub. No. 20030064228, due to their higher dissociation temperature. Superior latency is an advantageous characteristic from the viewpoint of the manufacturability of fiber-reinforced prepregs.

In certain embodiments of this invention, the epoxy resin composition contains at least one sulfonium salt represented by formula (III):

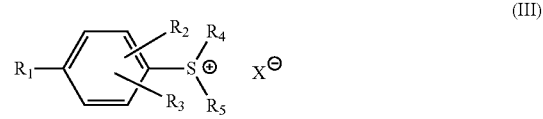

(III)

wherein $R_1$ represents a hydrogen atom, a hydroxyl group, an alkoxyl group, or a group represented by formula (IV):

(IV)

wherein Y' represents an alkyl group, an alkoxyl group, a phenyl group or a phenoxy group, each of which may have one or more substituents. Each of $R_2$ and $R_3$ independently represents a hydrogen atom, a halogen atom, or an alkyl group. Each of $R_4$ and $R_5$ independently represents an alkyl group, an aralkyl group or an aryl group, each of which may have one or more substituents. $X^-$ represents $SbF_6^-$, $PF_6^-$, $AsF_6^-$, or $BF_4^-$.

If the amount of latent acid catalyst included in the epoxy resin composition is too small, the temperature and time required to cure the material may become impractical. In addition, reducing the amount of latent acid catalyst too significantly will make the reaction of the cycloaliphatic epoxy and the amine curing agent incompatible. Including too much latent acid catalyst can destabilize the epoxy resin composition, making it unmanufacturable as well as increasing the risk of an uncontrolled exotherm, causing the resin to overheat and burn during cure. In light of these considerations, the amount of latent acid catalyst included in the epoxy resin composition may be between 0.2 and 4 parts by weight of the total amount of epoxy resin. In one embodiment, the amount of latent acid catalyst included in the epoxy resin composition may be between 0.3 and 1.5 parts by weight of the total amount of epoxy resin ([A]+[B]+[E]).

Examples of constituent component [D] include [4-(acetyloxy)phenyl]dimethylsulfonium, (OC-6-11)-hexafluoroantimonate(1-); (4-hydroxyphenyl)dimethylsulfonium, hexafluorophosphate(1-); (4-hydroxyphenyl)methyl[(2-methylphenyl)methyl]sulfonium, (OC-6-11)-hexafluoroantimonate(1-); (4-hydroxyphenyl)methyl(phenylmethyl)sulfonium (OC-6-11)-hexafluoroantimonate (1-); and the like and combinations thereof.

In the present invention, the epoxy resin composition may additionally include one or more stabilizers as constituent component [H]. Such stabilizers are used in combination with the above-mentioned latent acid catalyst, and contribute to the storage stability of the epoxy resin composition.

Specific suitable examples of constituent component [H] include 4-(methylthio)phenol and its ether derivatives.

In spite of their benefits, aromatic glycidyl ether type and aromatic glycidyl amine type epoxies have fairly high viscosities, making them difficult to process. To solve this problem, they may be combined with another low molecular weight epoxy, such as a cycloaliphatic epoxy component [E], as disclosed in U.S. Pat. Pub. No. 20030064228.

In certain embodiments of the present invention, constituent component [E] is a cycloaliphatic epoxy resin represented by formula (V), wherein Y is a single bond or represents a divalent moiety having a molecular weight less than 45 g/mol:

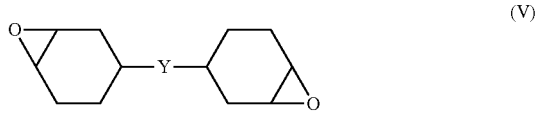

(V)

Here, a cycloaliphatic epoxy resin means an epoxy resin in which there is at least one 1,2-epoxycycloalkane structural moiety. As previously stated, cycloaliphatic epoxy resins are useful because they can reduce the viscosity of the resin composition. However, typical cycloaliphatic epoxies, such as 3,4-epoxycyclohexylmethyl and 3,4-epoxycyclohexanecarboxylate can also reduce the glass transition temperature and modulus of the cured material. To solve this problem, cycloaliphatic epoxies with shorter, more rigid, linkages between 1,2-epoxycycloalkane groups are employed in the present invention.

While glycidyl ether and glycidyl amine type epoxy resins react well with amine curing agents, cycloaliphatic epoxy resins have typically shown poor reactivity with polyamines. As disclosed in U.S. Pat. Pub. No. 20030064228, if a suitable acid catalyst is also present in the cycloaliphatic epoxy resin composition, there is coordination of a proton or Lewis acid to the oxygen atom of the epoxy groups, making them susceptible to nucleophilic substitution, and the cycloaliphatic epoxy resin then becomes reactive with the amine curing agent under practical curing conditions. This can allow the desirable reaction of the amine curing agent with the cyclic structure of the cycloaliphatic epoxy resin, resulting in molecular motion of the polymer chain being restricted and the heat resistance and modulus of elasticity of the cured material obtained are raised.

Suitable cycloaliphatic epoxy resins for purposes of the present invention may be represented by formula (V), wherein Y is a single bond or represents a divalent moiety having a molecular weight less than 45 g/mol:

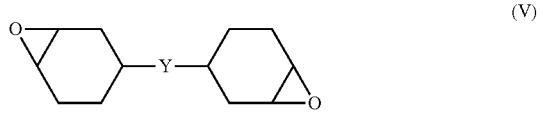

(V)

For example, the divalent moiety having a molecular weight less than 45 g/mol may be oxygen (Y=—O—), alkylene (e.g., Y=—$CH_2$—, —$CH_2CH_2$—, —$CH_2CH_2CH_2$—, —$CH_2CH(CH_3)$— or —$C(CH_3)_2$—), an ether-containing moiety (e.g., Y=—$CH_2OCH_2$—), a carbonyl-containing moiety (e.g., Y=—C(=O)—), or an oxirane ring-containing moiety (e.g., Y=—CH—O—CH—, wherein a single bond exists between the two carbon atoms thereby forming a three-membered ring including the oxygen atom and the two carbon atoms).

Employing a cycloaliphatic epoxy with an aforementioned divalent moiety having a molecular weight less than 45 g/mol is advantageous, as the molecule's rigidity increases the modulus of the cured material. Furthermore, including a divalent moiety that meets the previously mentioned criteria but is also capable of forming a covalent bond with other components of the resin formulation is advantageous since increasing the crosslink density can improve both the glass transition temperature and modulus of the cured material.

Specific illustrative examples of constituent component [E] are bis(3,4-epoxycyclohexyl) (where Y is a single bond, also referred to as 3,4,3',4'-diepoxybicyclohexyl), bis[(3,4-epoxycyclohexyl)ether] (where Y is an oxygen atom), bis[(3,4-epoxycyclohexyl)oxirane] (where Y is an oxirane ring, —CH—O—CH—), bis[(3,4-epoxycyclohexyl)methane] (where Y is methylene, $CH_2$), 2,2-bis(3,4-epoxycyclohexyl)propane (where Y is —$C(CH_3)_2$—) and the like and combinations thereof.

Such cycloaliphatic epoxy resins are known in the art and may be prepared using any suitable synthetic method, including, for example, by epoxidizing cycloaliphatic di- and triolefinic compounds such as compounds having a 3,3'-dicyclohexenyl skeleton. U.S. Pat. No. 7,732,627 and U.S. Pat. Pub. Nos. 2004/0242839 and 2014/0357836, for instance, describe methods for obtaining cycloaliphatic epoxy resins useful in the present invention.

The relative amounts of component [A], [B], and [E] may be varied as may be desired in order to impart certain characteristics to the epoxy resin composition or to the cured epoxy resin composition or to a fiber-reinforced composite material obtained by curing a prepreg comprised of fiber (e.g., carbon fiber) and the epoxy resin composition. Typically, however, the epoxy resin composition will comprise at least 5 parts by weight [A]+[B] and at least 5 parts by weight [E] per 100 parts by weight in total of [A], [B] and [E]. For example, in various embodiments of the invention the epoxy resin composition is comprised of 15 to 70 parts by weight [E] per 100 parts by weight in total of [A], [B] and [E].

In this invention, mixing or dissolving a thermoplastic resin, constituent component [F], into the above-mentioned epoxy resin composition may also be desirable to enhance the properties of the cured material. In general, a thermoplastic resin (polymer) having bonds selected from the group consisting of carbon-carbon bonds, amide bonds, imide bonds, ester bonds, ether bonds, carbonate bonds, urethane bonds, thioether bonds, sulfone bonds and/or carbonyl bonds in the main chain is preferred. Further, the thermoplastic resin can also have a partially crosslinked structure and may be crystalline or amorphous. In particular, it is suitable that at least one thermoplastic resin selected from the group consisting of polyamides, polycarbonates, polyacetals, polyphenylene oxides, polyphenylene sulfides, polyallylates, polyesters, polyamideimides, polyimides (including polyimides having a phenyltrimethylindane structure), polyetherimides, polysulfones, polyethersulfones, polyetherketones, polyetheretherketones, polyaramids, polyethernitriles and polybenzimidazoles is mixed or dissolved into the epoxy resin composition.

In order to obtain high heat resistance, in certain embodiments of the present invention the glass transition temperature (Tg) of the thermoplastic resin is at least 150° C. or higher and in other embodiments the glass transition temperature will be 170° C. or higher. If the glass transition temperature of the mixed thermoplastic resin is lower than 150° C., the cured article obtained may likely be deformed by heat when it is used. Further, a thermoplastic resin having hydroxyl groups, carboxyl groups, thiol groups, acid anhydride or the like as the end functional groups can be preferably used, since it can react with a cationically polymerizable compound.

Specific examples of suitable thermoplastic resins are polyethersulfones and the polyethersulfone-polyetheretherkone copolymer oligomers as described in US Pat. Publication No. 2004/044141 A1; commercially available products of the polyetherimide type, etc. can also be used. An oligomer refers to a polymer with a relatively low molecular weight in which a finite number of approximately ten to approximately 100 monomer molecules are bonded to each other.

Although the epoxy resin composition need not contain thermoplastic resin, in various embodiments of the invention the epoxy resin composition is comprised of at least 5 or at least 10 parts by weight thermoplastic resin per 100 parts by weight in total of component [A], [B] and [E]. For example, the epoxy resin composition may be comprised of from 10 to 30 parts by weight thermoplastic resin per 100 parts by weight in total of components [A], [B] and [E].

In certain embodiments of the invention it may also be beneficial to include thermoplastic resin particles as constituent component [G]. Non-limiting examples of thermoplastic resins to be used in the form of the fine particles according to the present invention are the thermoplastic resins having in the main chain a bond chosen from the carbon-carbon bond, amide bond, imide bond, ester bond, ether bond, carbonate bond, urethane bond, urea bond, thioether bond, sulfone bond, imidazole bond and the carbonyl bond. Specifically, there may be cited vinylic resins represented by polyacrylate, poly(vinyl acetate) and polystyrol, thermoplastic resins belonging to the engineering plastics such as polyamide, polyaramid, polyester, polyacetal, polycarbonate, poly(phenylene oxide), poly(phenylene sulfide), polyallylate, polybenzimidazole, polyimide, polyamideimide, polyetherimide, polysulfone, polyethersulfone and polyetheretherketone, hydrocarbon resins represented by polyethylene and polypropylene and cellulose derivatives such as cellulose acetate and cellulose lactate.

Particularly, polyamide, polycarbonate, polyacetal, poly(phenylene oxide), poly(phenylene sulfide), polyallylate, polyester, polyamideimide, polysulfone, polyethersulfone, polyetheretherketone, polyaramid and polybenzimidazole are distinguished in impact resistance and are suitable as a material for the fine particles used according to the present invention. Of these, polyamide, polyethersulfone and polysulfone are highly tenacious and heat resistant and are preferable for the present invention. The tenacity of polyamide is particularly distinguished, and by using a polyamide such as non-crystalline transparent nylon, heat resistance is provided concurrently.

The fine particles can also be formed from a mixture or blend of a thermosetting resin and a thermoplastic resin. The thermosetting resin and thermoplastic resin in this case can be preferably selected from those enumerated above. For example, if a mixture or blend of a phenol resin and a nylon resin is used, the water absorption coefficient of nylon resin can be lowered to raise the glass transition temperature (Tg), while at the same time maintaining the toughness of nylon resin, and thus, the component [G] can be excellent in heat resistance and water resistance.

The quantity of the component [G] is preferably within the range of 0 to 100 parts by weight to 100 parts by weight of epoxy resin. When it is over 100 parts by weight, blending with the epoxy resins becomes difficult, and further the tackiness and draping property of the prepreg are greatly reduced. In order to retain the rigidity of the cured epoxy resin composition for development of the compressive strength of the composite material, improve the interlaminar fracture toughness of the composite material with fine particles and maintain the characteristics of high rupture elongation and flexibility, a smaller quantity of the fine particles within the range of 1 to 30 parts by weight to 100 parts by weight of epoxy resin is preferable.

In various embodiments of the invention, the epoxy resin composition may comprise, consist essentially of or consist of the following components:
  Component [A]: 5-45 parts by weight per 100 parts by weight [A]+[B]+[E];
  Component [B]: 15-55 parts by weight per 100 parts by weight [A]+[B]+[E];
  Component [C]: 20-35 parts by weight per 100 parts by weight [A]+[B]+[E];
  Component [D]: 0.2-2 parts by weight per 100 parts by weight [A]+[B]+[E];
  Component [E]: 35-45 parts by weight per 100 parts by weight [A]+[B]+[E];
  Component [F]: 10-20 parts by weight per 100 parts by weight [A]+[B]+[E]
  Component [G]: 0-100 parts by weight per 100 parts by weight [A]+[B]+[E].

The mechanical properties of the fiber-reinforced composite material are influenced by the various properties of the matrix obtained by curing the epoxy resin composition.

The elastic modulus of the epoxy resin composition influences the fiber-direction compression strength and tensile strength of the fiber-reinforced composite material, and the higher the value thereof the better. Consequently, it is preferred that the cured product of the epoxy resin composition of the present invention has a high elastic modulus.

The glass transition temperature of the epoxy resin composition influences the heat resistance of the fiber-reinforced composite material. It is preferred that the cured product of the epoxy resin composition of the present invention has a high glass transition temperature. Specifically, it is preferred that the glass transition temperature of the cured material obtained be at least 220° C.

In the preparation of the epoxy resin composition of the present invention, a kneader, planetary mixer, triple roll mill, twin screw extruder, and the like may advantageously be used. After the epoxy resins are placed in the equipment, the mixture is heated to a temperature in the range of from 80 to 180° C. while being stirred so as to uniformly dissolve the epoxy resins. During this process, other components, excluding the thermoplastic resin particles, amine curing agent(s), and latent acid catalyst(s) (e.g., thermoplastic resin, inorganic particles) may be added to the epoxy resins and kneaded with them. After this, the mixture is cooled down to a temperature of no more than 100° C. in some embodiments, no more than 80° C. in other embodiments or no more than 60° C. in still other embodiments, while being stirred, followed by the addition of the thermoplastic resin particles, amine curing agent(s), and latent acid catalyst(s) and kneading to disperse those components. This method may be used to provide an epoxy resin composition with excellent storage stability.

Next, FRP (fiber reinforced plastic) materials are described. By curing embodiments of the epoxy resin composition after impregnating reinforcing fibers with it, a FRP material that contains, as its matrix resin, embodiments of the epoxy resin composition in the form of a cured product may be obtained.

There are no specific limitations or restrictions on the type of reinforcing fiber used in the present invention, and a wide range of fibers, including glass fiber, carbon fiber, graphite fiber, aramid fiber, boron fiber, alumina fiber and silicon carbide fiber, may be used. Carbon fiber may provide FRP materials that are particularly lightweight and stiff. Carbon fibers with a tensile modulus of 180 to 800 GPa may be used, for example. If a carbon fiber with a high modulus of 180 to 800 GPa is combined with an epoxy resin composition of the present invention, a desirable balance of stiffness, strength and impact resistance may be achieved in the FRP material.

There are no specific limitations or restrictions on the form of reinforcing fiber, and fibers with diverse forms may be used, including, for instance, long fibers (drawn in one direction), tow, fabrics, mats, knits, braids, and short fibers (chopped into lengths of less than 10 mm). Here, long fibers mean single fibers or fiber bundles that are effectively continuous for at least 10 mm. Short fibers, on the other hand, are fiber bundles that have been chopped into lengths of less than 10 mm. Fiber configurations in which reinforcing fiber bundles have been aligned in the same direction may be suitable, for applications where a high specific strength and specific modulus are required.

FRP materials of the present invention may be manufactured using methods such as the prepreg lamination and molding method, resin transfer molding method, resin film infusion method, hand lay-up method, sheet molding compound method, filament winding method and pultrusion method, though no specific limitations or restrictions apply in this respect.

Resin transfer molding is a method in which a reinforcing fiber base material is directly impregnated with a liquid thermosetting resin composition and cured. Since this method does not involve an intermediate product, such as a prepreg, it has great potential for molding cost reduction and is advantageously used for the manufacture of structural materials for spacecraft, aircraft, rail vehicles, automobiles, marine vessels and so on.

Prepreg lamination and molding is a method in which a prepreg or prepregs, produced by impregnating a reinforcing fiber base material with a thermosetting resin composition, is/are formed and/or laminated, followed by the curing of the resin through the application of heat and pressure to the formed and/or laminated prepreg/prepregs to obtain a FRP material.

Filament winding is a method in which one to several tens of reinforcing fiber rovings are drawn together in one direction and impregnated with a thermosetting resin composition as they are wrapped around a rotating metal core (mandrel) under tension at a predetermined angle. After the wraps of rovings reach a predetermined thickness, it is cured and then the metal core is removed.

Pultrusion is a method in which reinforcing fibers are continuously passed through an impregnating tank filled with a liquid thermosetting resin composition to impregnate them with the thermosetting resin composition, followed by a squeeze die and heating die for molding and curing, by continuously drawing them using a tensile machine. Since this method offers the advantage of continuously molding FRP materials, it is used for the manufacture of FRP materials for fishing rods, rods, pipes, sheets, antennas, architectural structures, and so on.

Of these methods, the prepreg lamination and molding method may be used to give excellent stiffness and strength to the FRP materials obtained.

Prepregs may contain embodiments of the epoxy resin composition and reinforcing fibers. Such prepregs may be obtained by impregnating a reinforcing fiber base material with an epoxy resin composition of the present invention. Impregnation methods include the wet method and hot melt method (dry method).

The wet method is a method in which reinforcing fibers are first immersed in a solution of an epoxy resin composition, created by dissolving the epoxy resin composition in a solvent, such as methyl ethyl ketone or methanol, and retrieved, followed by the removal of the solvent through evaporation via an oven, etc. to impregnate reinforcing fibers with the epoxy resin composition. The hot-melt method may be implemented by impregnating reinforcing fibers directly with an epoxy resin composition, made fluid by heating in advance, or by first coating a piece or pieces of release paper or the like with an epoxy resin composition for use as resin film and then placing a film over one or either side of reinforcing fibers as configured into a flat shape, followed by the application of heat and pressure to impregnate the reinforcing fibers with the resin. The hot-melt method may give the prepreg having virtually no residual solvent in it.

The reinforcing fiber cross-sectional density of a prepreg may be 50 to 350 g/m$^2$. If the cross-sectional density is at least 50 g/m$^2$, there may be a need to laminate a small number of prepregs to secure the predetermined thickness when molding a FRP material and this may simplify lamination work. If, on the other hand, the cross-sectional density is no more than 350 g/m$^2$, the drapability of the prepreg may be good. The reinforcing fiber mass fraction of a prepreg may be 50 to 90 mass % in some embodiments, 60 to 85 mass % in other embodiments or even 70 to 80 mass % in still other embodiments. If the reinforcing fiber mass fraction is at least 50 mass %, there is sufficient fiber content, and this may provide the advantage of a FRP material in terms of its excellent specific strength and specific modulus, as well as preventing the FRP material from generating too much heat during the curing time. If the reinforcing fiber mass fraction is no more than 90 mass %, impregnation with the resin may be satisfactory, decreasing a risk of a large number of voids forming in the FRP material.

To apply heat and pressure under the prepreg lamination and molding method, the press molding method, autoclave molding method, bagging molding method, wrapping tape method, internal pressure molding method, or the like may be used as appropriate.

Autoclave molding is a method in which prepregs are laminated on a tool plate of a predetermined shape and then covered with bagging film, followed by curing, performed through the application of heat and pressure while air is drawn out of the laminate. It may allow precision control of the fiber orientation, as well as providing high-quality molded materials with excellent mechanical characteristics, due to a minimum void content. The pressure applied during the molding process may be 0.3 to 1.0 MPa, while the molding temperature may be in the 90 to 300° C. range. Due to the exceptionally high Tg of the cured epoxy resin composition of the present invention, it may be advantageous to carry out curing of the prepreg at a relatively high temperature (e.g., a temperature of at least 180° C. or at least 200° C.). For example, the molding temperature may be from 200° C. to 275° C. Alternatively, the prepreg may be molded at a somewhat lower temperature (e.g., 90° C. to 200° C.), demolded, and then post-cured after being removed from the mold at a higher temperature (e.g., 200° C. to 275° C.).

The wrapping tape method is a method in which prepregs are wrapped around a mandrel or some other cored bar to form a tubular FRP material. This method may be used to produce golf shafts, fishing poles and other rod-shaped products. In more concrete terms, the method involves the wrapping of prepregs around a mandrel, wrapping of wrapping tape made of thermoplastic film over the prepregs under tension for the purpose of securing the prepregs and applying pressure to them. After curing of the resin through heating inside an oven, the cored bar is removed to obtain the tubular body. The tension used to wrap the wrapping tape may be 20 to 100 N. The molding temperature may be in the 80 to 300° C. range.

The internal pressure forming method is a method in which a preform obtained by wrapping prepregs around a thermoplastic resin tube or some other internal pressure applicator is set inside a metal mold, followed by the introduction of high pressure gas into the internal pressure applicator to apply pressure, accompanied by the simultaneous heating of the metal mold to mold the prepregs. This method may be used when forming objects with complex shapes, such as golf shafts, bats, and tennis or badminton rackets. The pressure applied during the molding process may be 0.1 to 2.0 MPa. The molding temperature may be between room temperature and 300° C. or in the 180 to 275° C. range.

The FRP material produced from the prepreg of the present invention may have a class A surface as mentioned above. The term "class A surface" means a surface that exhibits extremely high finish quality characteristics free of aesthetic blemishes and defects.

FRP materials that contain cured epoxy resin compositions obtained from epoxy resin compositions of the present invention and reinforcing fibers are advantageously used in sports applications, general industrial applications, and aeronautic and space applications. Concrete sports applications in which these materials are advantageously used include golf shafts, fishing rods, tennis or badminton rackets, hockey sticks and ski poles. Concrete general industrial applications in which these materials are advantageously used include structural materials for vehicles, such as automobiles, bicycles, marine vessels and rail vehicles, drive shafts, leaf springs, windmill blades, pressure vessels, flywheels, papermaking rollers, roofing materials, cables, and repair/reinforcement materials.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the composition or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

The entire disclosure of each patent, published patent application or other publication mentioned herein is hereby incorporated by reference for all purposes.

EXAMPLES

In the examples of the present invention, the measurements of the properties were based on the methods described below. The details for each of the examples are shown in Table 1.

<Resin Plaque Preparation>

A mixture was created by dissolving the prescribed amounts of all the components other than the thermoplastic resin particles, curing agent and the curing catalyst in a mixture. Then the prescribed amounts of the thermoplastic resin particles, curing agent and catalyst were mixed into the mixture to obtain the epoxy resin composition. The epoxy resin composition was dispensed into a mold cavity set for a thickness of 2 mm using a 2 mm-thick polytetrafluoroethylene (PTFE) spacer. Then, the epoxy resin composition was cured by heat treatment in an oven to obtain a 2 mm-thick cured resin plaque.

Cure Condition (1) temperature raised at a rate of 1.5° C./min from room temperature to 180° C.;
(2) hold for two hours at 180° C.;
(3) temperature raised at a rate of 1.5° C./min from 180° C. to 210° C.;
(4) hold for two hours at 210° C.; and
(5) temperature lowered from 210° C. to 30° C. at a rate of 3° C./min.

<Glass Transition Temperature of Cured Epoxy Resin Compositions>

Specimens were machined from the cured two mm resin plaque, and then measured at 1.0 Hz in torsion mode using a dynamic viscoelasticity measuring device (ARES, manufactured by TA Instruments) by heating it from 50° C. to 300° C. at a rate of 5° C./min in accordance with SACMA SRM 18R-94. Tg was determined by finding the intersection between the tangent line of the glassy region and the tangent line of the transition region between the glassy region and the rubbery region on the temperature-elastic storage modulus curve. The temperature at that intersection was considered to be the glass transition temperature, commonly referred to as G' onset Tg.

<Storage Modulus of Cured Epoxy Resin Compositions>

Specimens were machined from the cured two mm resin plaque, and then measured at 1.0 Hz in torsion mode using a dynamic viscoelasticity measuring device (ARES, manufactured by TA Instruments) by heating it from 50° C. to 300° C. at a rate of 5° C./min in accordance with SACMA SRM 18R-94. The percent strain applied to the specimen was adjusted so that 150±5 g-cm of torque was applied to the specimen at the start of the test, 50° C. Storage modulus was determined by finding the rubbery region, the plateau occurring after the glass transition temperature as determined by G' onset method, on the temperature-elastic storage modulus curve. In this case the storage modulus was taken at a fixed temperature, 275° C., substantially representative of the storage modulus for the entire rubbery region. The storage modulus was taken at 275° C. regardless of the presence of a rubber plateau on the temperature-elastic storage modulus curve.

<Production of Fiber-Reinforced Composite Material>

A mixture was created by dissolving the prescribed amounts of all the components, other than the thermoplastic resin particles, amine curing agent and the latent acid catalyst, in a mixture. Then the prescribed amounts of the thermoplastic resin particles, curing agent and catalyst were mixed into the mixture to obtain the epoxy resin composition. The produced epoxy resin composition was applied onto release paper using a knife coater to produce 2 sheets of resin film. Next, the aforementioned two sheets of fabricated resin film were overlaid on both sides of unidirectionally oriented carbon fibers and the resin was impregnated using heated rollers to apply temperature and pressure to produce a unidirectional prepreg.

<Microcrack Resistance of the Fiber-Reinforced Composite Material>

Eight plies of unidirectional prepreg were laminated in a [90₂, 0₄, 90₂] structure and degassed at 25° C. and a degree of vacuum of 75 KPa. The body was then placed in an autoclave with the degree of vacuum being maintained at 75 KPa until the autoclave was pressurized to 138 KPa at which point the vacuum bag was vented until the end of the cure. When the autoclave pressure reached 586 KPa the temperature was increased at a rate of 1.5° C./min to a temperature of 180° C. and maintained for 120 minutes to cure the prepreg and produce a laminate body 300 mm long and 300 mm wide. The laminate body was then post cured in a convection oven by increasing the temperature at a rate of 1.5° C./min to a temperature of 210° C. and maintained for 120 minutes. Three specimens 75 mm (0°)×50 mm were machined from the 300 mm×300 mm laminate body and then exposed to a thermal cycle. The 0° and 90° cross sections were then polished and examined for microcracking using optical microscopy. The specimen was determined to "pass" the microcrack resistance test if it had substantially no cracks perpendicular to the fiber direction. The specimen was determined to "fail" the microcrack resistance test if several cracks perpendicular to the fiber direction could be seen.

Thermal Cycle
(1) temperature decreased at a rate of 2° C./min from room temperature to −50° C.;
(2) hold for 10 minutes at −50° C.;
(3) temperature increased at a rate of 5° C./min from −50° C. to 120° C.;
(4) hold for 10 minutes at 120° C.;
(5) temperature decreased at a rate of 2° C./min from 120° C. to room temperature;
(6) Repeat steps 1-5 until 10 cycles have been completed.

<Raw Materials>

The following commercial products were employed in the preparation of the epoxy resin composition.

Carbon Fibers:
"Torayca" T800S-24K-10E (registered trademark, produced by Toray with a fiber count of 24,000, tensile strength of 5,880 MPa, tensile elasticity of 294 GPa, and tensile elongation of 2.0%).

Constituent Component [A]:
"Araldite" MY 0816 (registered trademark, produced by Huntsman Advanced Materials)
"Epiclon" HP-4770 (registered trademark, produced by DIC Corporation)
"Epiclon" HP-5000L (registered trademark, produced by DIC Corporation)
NC-7000L (produced by Nippon Kayaku Corporation)

Constituent Component [B]:
"Tactix" 742 (registered trademark, produced by Huntsman Advanced Materials)
"Araldite" MY 721 (registered trademark, produced by Huntsman Advanced Materials)
"Araldite" MY 0610 (registered trademark, produced by Huntsman Advanced Materials)
"Epiclon" HP-4710 (registered trademark, produced by DIC Corporation)

Constituent Component [C]:
"Aradur" 9664-1 (registered trademark, produced by Huntsman Advanced Materials)
"Aradur" 9719-1 (registered trademark, produced by Huntsman Advanced Materials)

Constituent Component [D]:
"San-Aid" SI-150 (registered trademark, produced by SAN-SHIN CHEMICAL INDUSTRY CO., LTD)
"San-Aid" SI-180 (registered trademark, produced by SAN-SHIN CHEMICAL INDUSTRY CO., LTD)

Constituent Component [E]:
"Celloxide" 2021P (registered trademark, produced by Daicel Chemical Industries)
"Celloxide" 8000 (registered trademark, produced by Daicel Chemical Industries)
"Celloxide" 8200 (registered trademark, produced by Daicel Chemical Industries).

Constituent Component [F]:
"Virantage" VW10700 (registered trademark, produced by Solvay SA).

Constituent Component [G]:
TN Particles (produced by Toray Industries, Inc.).

Other Components:
"EPON" 825 (registered trademark, produced by Hexion Inc.).
"EPON" 1001 (registered trademark, produced by Hexion Inc.).

The resin compositions as shown in Table 1 were produced as follows. A mixture was created by dissolving the prescribed amounts of all the components, other than the thermoplastic resin particles, curing agent and the curing catalyst, in a mixture. Then the prescribed amounts of the thermoplastic resin particles, curing agent and catalyst were mixed into the mixture to obtain the epoxy resin composition. The epoxy resin composition was dispensed into a mold cavity set for a thickness of 2 mm using a 2 mm-thick polytetrafluoroethylene (PTFE) spacer. Then, the epoxy resin composition was cured according to condition 1 by heat treatment in an oven under the various cure conditions to obtain a 2 mm-thick cured resin plaque. The measured properties of the neat resin compositions are stated in Table 1.

The prepreg used to make the laminates on which the microcrack performance was measured was made by applying the resin composition onto release paper using a knife coater to produce two sheets of 51.7 g/m² resin film. Next, the aforementioned two sheets of fabricated resin film were overlaid on both sides of unidirectionally oriented carbon fibers in the form of a sheet (T800S-24K-10E) and the resin was impregnated using a roller temperature of 100° C. and a roller pressure of 0.07 MPa to produce a unidirectional prepreg with a carbon fiber area weight of 190 g/m² and a matrix resin weight content of 35%.

example 4 and comparative example 2 highlights this advantage, demonstrating that a substitution of HP-4770, a naphthalene-based epoxy resin with an EEW of 205, for MY0816, a naphthalene-based epoxy resin with an EEW of 148, resulted in reducing the storage modulus of the epoxy resin composition from 60 MPa to 19 MPa, preventing microcracking, without reducing the glass transition temperature.

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Epoxy resin | Epiclon ® HP-4770 [A] | 10 | 20 | 20 | 40 |  |  | 40 | 40 | 40 | 40 |
|  | Araldite ® MY 0610 [B] |  |  |  |  |  |  | 20 |  |  |  |
|  | Araldite ® MY 721 [B] | 50 | 40 | 40 | 20 | 20 | 40 |  | 20 | 20 | 20 |
|  | NC-7000L [A] |  |  |  |  | 40 |  |  |  |  |  |
|  | HP-5000L [A] |  |  |  |  |  | 20 |  |  |  |  |
| Curing agent [C] | Aradur ® 9664-1 | 31 | 28 | 28 | 23 | 23 | 28 | 25 | 23 | 23 |  |
|  | Aradur ® 9719-1 |  |  |  |  |  |  |  |  |  | 23 |
| Catalyst [D] | SAN-AID ® SI-150 | 1 | 1 | 1 | 1 | 1 | 1 | 1 | 1 |  | 1 |
|  | SAN-AID ® SI-180 |  |  |  |  |  |  |  |  | 0.5 |  |
| Epoxy resin [E] | Celloxide ® 8000 | 40 | 40 | 40 | 40 | 40 | 40 | 40 |  |  |  |
|  | Celloxide ® 8200 |  |  |  |  |  |  |  | 40 | 40 | 40 |
| Thermoplastic resin [F] | Virantage ® VW10700 | 15 | 15 | 15 | 15 | 15 | 15 | 15 | 15 | 15 | 15 |
| Thermoplastic particles [G] | TN Particles |  |  |  | 10 |  |  |  |  |  |  |
| Resin properties | Glass Transition temperature (° C.) | 233 | 236 | 235 | 240 | 235 | 222 | 230 | 230 | 235 | 225 |
|  | Storage modulus at 275° C. (MPa) | 32 | 28 | 30 | 19 | 30 | 25 | 21 | 23 | 21 | 16 |
| Composite properties | Microcracking | Pass | Pass | Pass | Pass | Pass | Pass | Pass | Pass | Pass | Pass |

TABLE 2

|  |  | Comparative Example 1 | Comparative Example 2 | Comparative Example 3 | Comparative Example 4 | Comparative Example 5 |
|---|---|---|---|---|---|---|
| Epoxy resin | EPON ® 825 | 40 |  |  |  |  |
|  | EPON ® 1001 |  |  |  | 10 |  |
|  | Araldite ® MY 0816 [A] |  | 40 |  |  | 40 |
|  | Epiclon ® HP-4770 [A] | 40 |  |  |  |  |
|  | Araldite ® MY 721 [B] | 20 | 20 | 30 | 50 | 20 |
|  | Epiclon ® HP-4710 [B] |  |  | 30 |  |  |
| Curing agent [C] | Aradur ® 9664-1 | 40 | 31 | 29 | 30 | 31 |
| Catalyst [D] | SAN-AID ® SI-150 | 1 | 1 | 1 | 1 | 1 |
| Epoxy resin [E] | Celloxide ® 8000 |  | 40 | 40 | 40 |  |
|  | Celloxide ® 2021P |  |  |  |  | 40 |
| Thermoplastic resin [F] | Virantage ® VW10700 | 15 | 15 | 15 | 15 | 15 |
| Resin properties | Glass Transition temperature (° C.) | 209 | 239 | 237 | 238 | 210 |
|  | Storage modulus at 275° C. (MPa) | 30 | 60 | 221 | 100 | 16 |
| Composite properties | Microcracking Resistance | Pass | Fail | Fail | Fail | Pass |

Examples 1 to 10 provided good results compared with comparative examples 1 and 5 in terms of glass transition temperature. Comparison between example 4 and comparative example 1 highlights this advantage, demonstrating that a substitution of Celloxide® 8000, a cycloaliphatic epoxy, for EPON 825, a bisphenol A epoxy resin, resulted in significant improvements in the glass transition temperature without increasing the storage modulus.

Examples 1 to 10 provided good results compared with comparative examples 2 to 4 in terms of glass transition temperature and microcrack resistance. This is due to the naphthalene-based epoxy resin having an EEW between 190 and 260 g/mol, providing a high glass transition without increasing the crosslink density. Comparison between

What is claimed is:

1. An epoxy resin composition for a fiber-reinforced composite material, comprising components [A], [B], [C], [D], and [E], wherein the epoxy resin composition when cured has a glass transition temperature greater than 220° C. and a storage modulus, less than 35 MPa, as determined from an elastic shear modulus measured at a temperature of at least 35° C. higher than the glass transition temperature, wherein the components [A], [B], [C], [D], and [E] comprise:

[A] at least one naphthalene-based epoxy resin having an EEW between 190 and 260 g/mol;
[B] at least one epoxy resin having a functionality of three or more;

[C] at least one amine curing agent;
[D] at least one latent acid catalyst; and
[E] at least one cycloaliphatic epoxy resin.

2. The epoxy resin composition according to claim 1, wherein the weight ratio of component [A] to component [B] is from 1:5 to 2:1.

3. An epoxy resin composition according to claim 1, wherein component [C] includes at least one aromatic polyamine.

4. An epoxy resin composition according to claim 1, wherein component [C] includes at least one diaminodiphenylsulfone.

5. The epoxy resin composition according to claim 1, wherein the amount of component [C] added is calculated using the EEW of components [A] and [B] so that the molar AEW/EEW ratio is 0.7 to 1.3.

6. The epoxy resin composition according to claim 1, wherein component [D] includes at least one onium salt catalyst represented by formula (III):

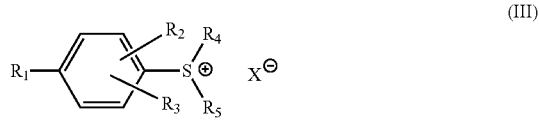

wherein $R_1$ represents a hydrogen atom, a hydroxyl group, an alkoxyl group, or a group represented by formula (IV):

wherein Y' represents an alkyl group, an alkoxyl group, a phenyl group or a phenoxy group, all of which may have one or more substituents, each of $R_2$ and $R_3$ independently represents a hydrogen atom, a halogen atom, or an alkyl group, each of $R_4$ and $R_5$ independently represents an alkyl group, an aralkyl group or an aryl group, each of which may have one or more substituents, and $X^-$ represents $SbF_6^-$, $PF_6^-$, $AsF_6^-$, or $BF_4^-$.

7. The epoxy resin composition according to claim 1, wherein component [E] includes at least one cycloaliphatic epoxy resin represented by formula (V), wherein Y is a single bond or represents a divalent moiety having a molecular weight less than 45 g/mol:

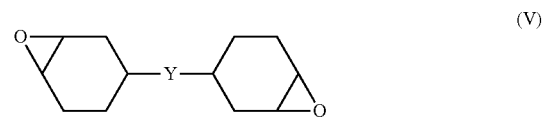

8. The epoxy resin composition according to claim 7, wherein component [E] includes at least one cycloaliphatic epoxy resin represented by formula (V), wherein Y is a single bond, O, $C(CH_3)_2$, $CH_2$ or an oxirane ring.

9. The epoxy resin composition according to claim 1, wherein component [A] includes at least one epoxy resin represented by formula I or formula II:

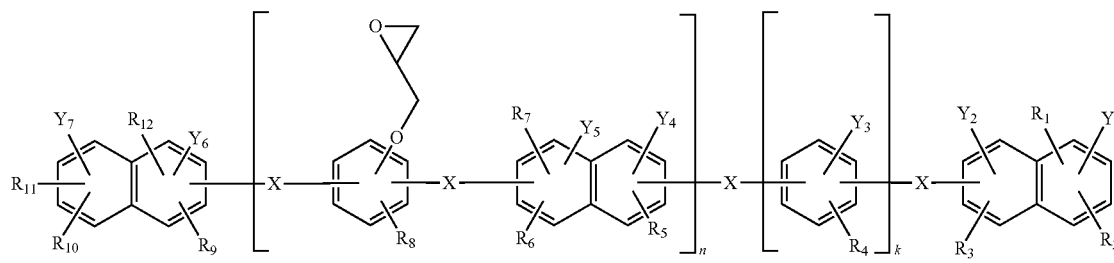

wherein $R_1$ to $R_{12}$ are each independently selected from the group consisting of hydrogen atoms, halogen atoms, C1 to C10 alkyl groups, C1 to C10 alkoxyl groups, C1 to C10 fluoroalkyl groups, cycloalkyl groups, aryl groups, aryloxyl groups, and glycidoxy groups, $Y_1$ to $Y_7$ are each independently selected from the group consisting of hydrogen atoms, halogen atoms, C1 to C10 alkyl groups, C1 to C10 alkoxyl groups, C1 to C10 fluoroalkyl groups, cycloalkyl groups, aryl groups, aryloxyl groups, and glycidoxy groups, wherein each benzene nucleus may be substituted with one or more Y groups, n is 0 or an integer of 1 to 5, k is 0 or an integer of 1 to 3, wherein the Y groups may be attached to either or both rings of each naphthalene nucleus; and each X is independently selected from the group consisting of a direct bond, $-CH_2-$, $-C(CH_3)_2-$, $-S-$, $-SO_2-$, $-O-$, $-C(=O)O-$, $-C(=O)NH-$, C1 to C6 alkylene groups, C1 to C6 alkoxylene groups, cycloalkylene groups, arylene groups and aryloxylene groups, wherein these groups are optionally employed individually or different groups are optionally employed in combination as X;

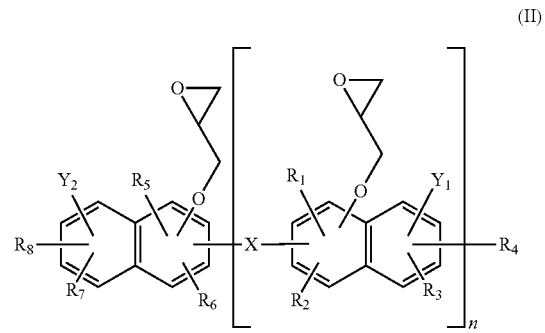

wherein n represents the number of repeating units and is an integer of 1 or more; $R_1$ to $R_8$ are each independently selected from the group consisting of a hydrogen atom, halogen atoms, C1 to C6 alkyl groups, C1 to C6 alkoxyl groups, C1 to C6 fluoroalkyl groups, cycloalkyl groups, aryl groups, and aryloxyl groups wherein these groups are optionally employed individually or different groups are optionally employed in combination as each of $R_1$ to $R_8$; $Y_1$ and $Y_2$ are each independently selected from the group consisting of a hydrogen atom or glycidyl ether groups; and each X is independently selected from the group consisting of a direct bond, $-CH_2-$, $-C(CH_3)_2-$, $-S-$, $-SO_2-$, $-O-$, $-C(=O)O-$, $-C(=O)NH-$, C1 to C6 alkylene groups, C1 to C6 alkoxylene groups, cycloalkylene groups, arylene groups and aryloxylene groups, wherein these groups are optionally employed individually or different groups are optionally employed in combination as X.

10. The epoxy resin composition according to claim 9, wherein component [A] includes at least one naphthalene glycidyl ether epoxy resin represented by formula VI, VII, or VIII:

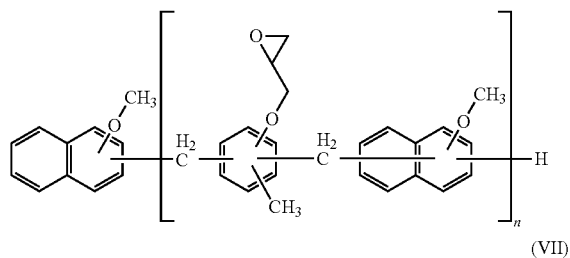

(VI)

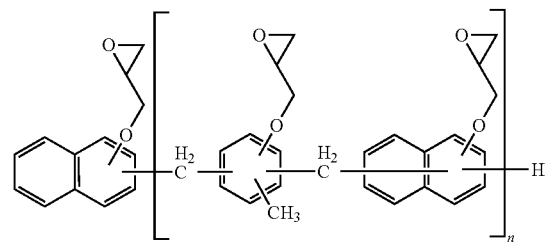

(VII)

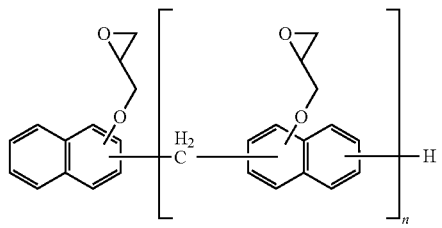

(VIII)

11. The epoxy resin composition according to claim 10, wherein component [B] includes at least one epoxy resin selected from the group consisting of triglycidyl ethers of tris(p-hydroxyphenyl)methane, N,N,N',N'-tetraglycidyl-4,4'-diaminodiphenylmethane, triglycidyl-m-aminophenol, and tetraglycidyl ethers of 1,6-bis(2-naphthyl)methane.

12. An epoxy resin composition according to claim 1, additionally comprising at least one thermoplastic resin.

13. An epoxy resin composition according to claim 1, additionally comprising at least one polyethersulfone.

14. The epoxy resin composition according to claim 1, additionally comprising a component [G], wherein component [G] comprises thermoplastic resin particles with an average particle diameter of 5 to 50 μm.

15. A prepreg, comprising a reinforcing fiber matrix impregnated with an epoxy resin composition in accordance with claim 1.

16. A fiber-reinforced composite material obtained by curing a prepreg in accordance with claim 15.

17. A fiber-reinforced composite material, comprising a cured epoxy resin product obtained by curing a mixture comprised of an epoxy resin composition in accordance claim 1 and a reinforcing fiber.

* * * * *